(Model.)
L. L. RICHMOND.
LOCK FOR BABY CARRIAGES.
No. 263,962.          Patented Sept. 5, 1882.
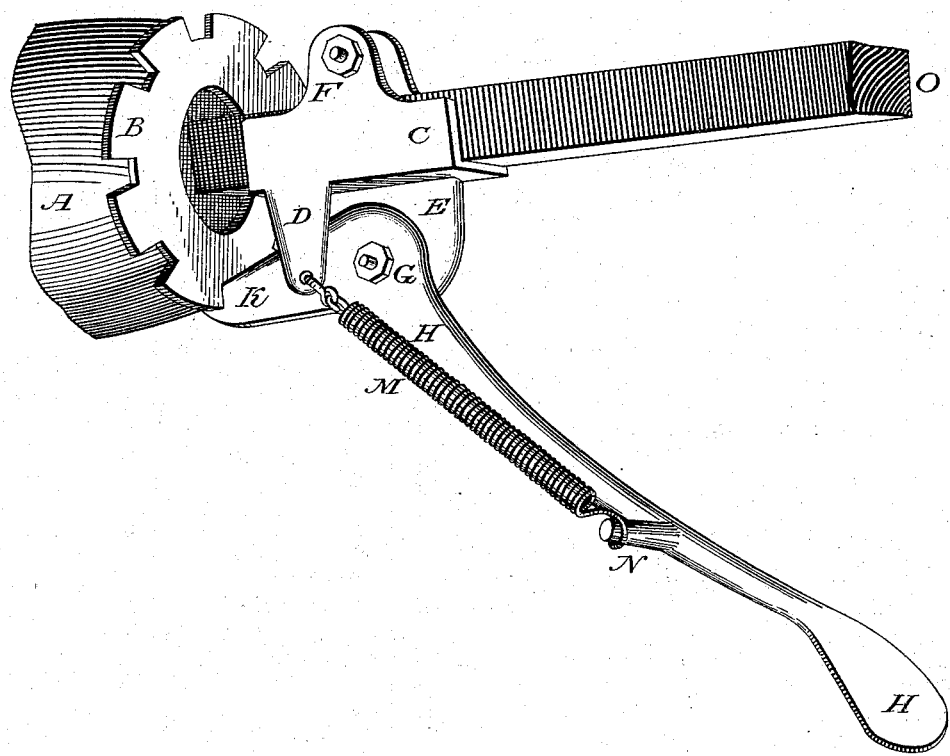
Witnesses:
A. B. Richmond
H. M. Richmond
Inventor:
Louis L. Richmond

UNITED STATES PATENT OFFICE.

LOUIS L. RICHMOND, OF MEADVILLE, PENNSYLVANIA.

LOCK FOR BABY-CARRIAGES.

SPECIFICATION forming part of Letters Patent No. 263,962, dated September 5, 1882.

Application filed March 7, 1882. (Model.)

*To all whom it may concern:*

Be it known that I, LOUIS L. RICHMOND, a citizen of the United States, residing at the city of Meadville, in the county of Crawford and State of Pennsylvania, have invented a new and Improved Lock for a Baby-Carriage, of which the following is a specification.

My invention relates to improvements in "locks" attached to "baby-carriages," by which one or more wheels can be locked in such a manner as to prevent their revolving, or be unlocked by an application of the foot of the person propelling the carriage without inconvenience or having to stoop to do it with the hand.

The drawing represents my lock attached to the axle-tree of a carriage.

A is the hub of a "hind wheel." On the inner end of this hub is a metal plate, B, with notches in the periphery thereof to catch the end K of the lever H H and lock the wheel, as hereinafter described.

C is a "clip" bolted on the axle-tree O by the bolt or screw F. One side of this clip C has an arm or projection, E, extending downward, and on which the lever H H is hung by a screw-bolt, G. The lever H H is bent at an obtuse angle at K, so that the part K will catch in the notches on the plate B when the lever is thrown in the position shown in the drawing.

N is a stud or short pin on the lever H H, on which the spiral spring M is hooked. The other end of the spring is hooked into a short arm at D on the clip C. By this spring the lever is kept in the position for locking the wheel, as shown in the drawing, or, when the same is unlocked, will hold the lever up against the axle-tree O and permit the wheel to revolve. This lever can be easily operated with the toe of the foot of the one propelling the carriage.

I am aware that spring-pawls operated by the handle by means of cords are old, and that I do not claim. In my device I pivot the bent pawl-lever in the same or nearly the same plane as the lower side of the hub by means of a lug pendent from the axle. I also attach a spring by one end to a pendent lug upon the axle, and to the long arm or pedal part of the lever at such a point that when the pawl part is in contact with the ratchet the tendency of the spring is to pull the pedal end of the lever away from the axle, and when the pawl is detached from the ratchet the tendency of the spring is to hold the pedal part against the axle, leaving the wheel at liberty to revolve.

What I claim as my invention is as follows, to wit:

In a baby-carriage, a hub having a ratchet upon its inner periphery, in combination with a bent pawl-lever pivoted below the axle, and a spring adapted to hold the pedal part of the lever in an elevated or depressed position, for the purpose set forth.

LOUIS L. RICHMOND.

Witnesses:
H. M. RICHMOND,
A. B. RICHMOND.